United States Patent Office 2,829,989
Patented Apr. 8, 1958

2,829,989

PROCESS FOR FRACTIONATING STARCH INTO COMPONENTS WITH BRANCHED AND LINEAR CHAINS

Willem C. Bus, The Hague, Johannes Muetgeert, Rotterdam, and Pieter Hiemstra, Veendam, Netherlands, assignors to Cooperatieve Verkoop- en Productievereniging van Aardappelmeel en Derivaten "Avebe" G. A., Veendam, Netherlands, a corporation of the Netherlands No Drawing. Application June 3, 1954
Serial No. 434,321

Claims priority, application Netherlands June 9, 1953

9 Claims. (Cl. 127—71)

A process for fractionating starch into components with linear chains (amylose) and branched chains (amylopectin) according to which the starch is dissolved in an aqueous solution containing at least one of the compounds magnesium sulphate, sodium sulphate or ammonium sulphate at elevated temperature and the solution thus obtained is slowly cooled down is described in our co-pending main patent application Nr. 325,698. On cooling amylose precipitates first and is separated from the mother liquor e. g. by means of a centrifuge; on further cooling the amylopectin precipitates, which can also easily be separated from the mother liquor.

It was generally supposed, that in fractionating starch, it is important to use a purified starch, because impurities, especially minute quantities of fatty acids, interfere with granule swelling and disintegration and solution of the starch.

It has now been found that the process described in patent application Nr. 325,698 can also be applied to raw materials containing other substances besides starch.

As such are considered e. g. the tertiary flour in the production of potato-flour, which contains besides starch considerable quantities of protein, cellulose and other organic substances and also inorganic pollutions such as clay, sand and the like and also potatoes, cereals as e. g. corn and wheat of which the cell structure has been broken by grinding or other wise.

Thus according to the invention the raw material is heated at a temperature exceeding about 115° C. with a solution containing at least one of the compounds $MgSO_4$, $Na_2SO_4$ or $(NH_4)_2SO_4$ in water until the starch has been dissolved and is filtered or centrifuged still in a hot state before amylose is allowed to separate. This first separation is preferably executed after the solution has been cooled to below the boiling point, but filtration at a higher temperature under pressure is also possible.

The filtered or centrifuged solid substance contains the inorganic water-insoluble pollutions and part of the organic substances.

On further cooling the filtrate which contains practically all the starch present in the raw material, in the way as indicated in the main patent application No. 325,698, first amylose precipitates and is separated from the mother liquor, and on cooling still further amylopectin precipitates and can be separated from the filtrate.

On dissolving at temperatures above 120° C. a reducing substance which is stable in an aqueous medium at this temperature, such as $Na_2SO_3$ may be added in the way as described in the main patent application Nr. 325,698. It was thought that by carrying out the process in an atmosphere of nitrogen, the darkening of the starch which occurs at these high temperatures would be avoided. Some improvement was obtained, but the result was not completely satisfactory. In addition, the working costs are considerably higher than when the process is carried out in the presence of air.

The addition of reducing agents which are themselves stable in an aqueous solution at the chosen dissolving temperature of the starch substantially reduces and in many cases prevents the darkening from taking place.

On account of the presence of relatively large quantities of substances causing coloration it may be necessary in some cases to use larger concentrations of reducing substances than those given in the main patent application Nr. 325,698.

Thus on using potatoes as raw material good results are obtained with quantities of 0.2–0.5% sodium sulphite, but a higher percentage, e. g. approx. 1%, can be of importance if a great many products causing coloration are present. It is preferred to employ at least 0.05% sodium sulphite. If the water used for dissolving the starch has a pH of over 7, it is of importance to use a mixture of sodium sulphite and sodium bisulphite. The prevention of color formation is especially important where the starch fractionation process is conducted in a cycle and the motherlye from which the starch has been separated is employed in dissolving a new quantity of starch-containing material. The reducing agent is also effective where aqueous solutions of sodium sulfate and ammonium sulfate are used as the fractionating liquid. It should be noted, however, that ammonium sulfate causes much more darkening than magnesium sulfate. Although the discoloration which occurs with ammonium sulfate cannot be entirely prevented, it is substantially reduced by this method.

Preferably $MgSO_4$ is used as the salt compound, but magnesium sulphate can entirely or partly be replaced by other salts, such as sodium sulphate or ammonium sulphate as described in the main patent application Nr. 325,698. In application Nr. 325,698, the magnesium sulfate, sodium sulfate, ammonium sulfate, or suitable mixtures thereof, are present in the aqueous fractionating solutions in a concentration of more than 5% and may be as much as about 30% by weight of the anhydrous salt. It is preferred, according to this invention, to use 5–30% of salt on the same basis. If the salt concentration is less than 5% by weight of anhydrous salt, the amylose and amylopectin are very difficult to separate by precipitation.

Several types of starch containing raw materials may be used in the process of this invention, including corn, wheat, potatoes and the like. It may be preferred to defat the materials before dissolving it in the fractionating solution, but this is not necessary. Very good results were obtained where sufficient raw material was dissolved to provide 3–8% starch in an aqueous magnesium sulfate solution having a concentration of from about 20 to about 30 grams of magnesium sulfate per 100 cc. of solution. It has been found possible to work with raw material solutions having up to 20% by weight of starch, thus providing a substantial reduction in processing costs. If starch concentrations of more than 8%, as for example 15% are employed, the salt concentration of the solution may be lower than with a starch concentration of 8% or less.

It is also possible to regulate the salt concentration of the solution in such a way that the amylose is precipitated at a temperature of more than 10° C. without any substantial precipitation of amylopectin and after separation of amylose and mother liquor to increase the salt concentration of the mother liquor, thus precipitating the amylopectin as more completely described in the co-pending patent application Nr. 429,104. This procedure allows the precipitation of amylose to take place at about room temperature and therefore avoids the difficult processing step of centrifuging the solution at a constant elevated temperature.

Precipitation of amylose and amylopectin from the solution depends not only upon the salt concentration and temperature of the solution but also upon other factors such as the viscosity of the solution, the starch concentration, the gravitational field of the centrifuge and upon the period of time lapsing between the time the solution reaches the amylose precipitating temperature and the time of centrifuging.

Preferably the starch is dissolved in a relatively concentrated salt solution which is thereafter diluted before separation of the amylose. The precipitate of amylose formed in a more concentrated salt solution is more easily separated from the mother liquor than a precipitate formed in a less concentrated salt solution. For example, starch is dissolved at a temperature of 160° C. in a solution having a concentration of between 25 and 30% of $MgSO_4.7H_2O$ by weight. The solution is cooled to 70° for an hour and a half and then diluted with water until the salt concentration is between 18 and 25%, preferably 20–23%. The solution is cooled to room temperature, at which point the amylose precipitates but the amylopectin precipitates very little or not at all. After separation of the amylose by centrifugation at room temperature, the concentration of $MgSO_4.7H_2O$ is increased to at least 25% and preferably 26–28% in order to precipitate the amylopectin. The ranges of salt concentration have been expressed above in terms of $MgSO_4.7H_2O$. The same ranges apply for $Na_2SO_4$ and for $(NH_4)_2SO_4$.

Amylose fractions of improved purity are obtained, according to this invention, if an organic compound from the group consisting of amyl alcohol, butyl alcohol, capryl alcohol and di-isopropyl ketone is employed in a small amount, as described in copending application Nr. 293,214. The effective levels set forth therein for each of the organic compounds also apply to the process of this invention. Thus, amyl alcohol (iso-pentanol) is effective when from about 1 to about 3.5 volume percent is employed. Effective ranges for other members of the group are: butyl alcohol, about 5 volume percent; capryl alcohol, from about 0.025 to about 0.50 volume percent, and di-isopropyl ketone, from about 0.4 to about 0.8 volume percent.

EXAMPLE I

Water is added to 50 kg. tertiary potato flour, containing 89% by weight of starch in its dry substance, and having a water content of 21%, 184 kg. $MgSO_4.7$ aq. and 3.2 kg. $Na_2SO_3.7$ aq. until the volume amounts to 800 l. Heating is subsequently effected in an autoclave at 160° C. for 15 minutes. After cooling to below the boiling point (approx. 100° C.) the substance is filtered through a filter press; the residue contains 13.2% by weight of the dry substance of the tertiary flour, 59% of which consists of cellulose.

On cooling the filtrate to 20–25° C. amylose precipitates and is centrifuged; the purity of the amylose is 83%, this fraction containing 23.2% by weight of the dry substance of the teritary flour.

When the salt concentration of the centrifugate is increased to 28%, the amylopectin precipitates and is separated from the mother liquor by means of a centrifuge or filter press; the content of amylopectin of the precipitate is 94% by weight of the dry substance and the precipitate contains 61% by weight of the dry substance, present in the raw material.

Sometimes it is preferable to add a slight quantity of an alcohol or a similar substance which is not entirely water miscible, as described in the main patent application to the solvent Nr. 293,214. Thus the purity of the amylose is 95% if 9.6 l. iso-pentanol are added to the solvent in this example.

EXAMPLE II

Potatoes are freed from sand, clay and other adhering dirt by brushing and flushing with water. The clean potatoes are reduced to small particles with a potato-rasp. The cell structure may also be disturbed in another way.

The analytical data of the potatoes used were as follows:

| | Percent |
|---|---|
| Total percentage of dry components which are insoluble in cold water, including starch | 26.7 |
| Ash residue | 1.03 |
| Nitrogen | 0.52 |
| Starch | 17.3 |
| Reducing sugars | 0.96 |

200 kg. of these rasped potatoes, if necessary after being freed from extractable juice, 200 kg. magnesium sulphate 7 aq., approx. 550 l. water, 8 kg. sodium sulphite 7 aq. and 0.75 kg. magnesium oxide are supplied with water to a total volume of 800 l. after 9.6 l. iso-pentanol have been added. This suspension is quickly brought to a temperature of 155° C. and kept at this temperature with violent stirring for 10 minutes. After cooling to 90° C. the liquid was filtered by means of a filter cloth with large pores (muslin), by which a filtercake is obtained, consisting of inorganic pollutions, crude fibre, protein and carbohydrate; this filtercake is called fraction I. The filtrate is cooled to 40–50° C. and the precipitate, formed on cooling, is centrifuged at 40–50° C.; the precipitate mainly consists of amylose and is called fraction II.

By increasing the salt concentration to 28% (g./100 cm.$^3$) the amylopectin is precipitated; this is fraction III.

Fractions I and II can be washed with water and with a mixture of water and amyl alcohol respectively to remove the salt. If amyl alcohol is removed from fraction II, e. g. by distillation, this fraction too can be freed from salt by washing with cold water only.

Results

Fraction I: 14.0 kg., i. e. 26.2% of the water-insoluble dry substance.

Fraction II: 8.8 kg., i. e. 16.5% of the water-insoluble dry substance; amylose content 85%.

Fraction III: 24.5 kg., i. e. 45.9% of the water insoluble dry substance; amylopectin content 98%.

95% of the starch which was originally present in the potatoes was consequently recovered, notably 95% of the amylose and 90% of the amylopectin.

EXAMPLE III

The cellulose structure of corn is disturbed by grinding or otherwise. The analytical data of the corn used were:

| | Percent |
|---|---|
| Starch | 63.3 |
| Protein | 8.5 |
| Cellulose | ⎫ |
| Fat | ⎬ 15.0 |
| Ash, etc. | ⎭ |
| Water | 13.2 |

21% of the starch present is amylose.

80 g. ground corn granules, 184 g. $MgSO_4.7$ aq., 3.2 g. $Na_2SO_3.7$ aq. and 0.4 g. MgO are supplied with water to a total content of 800 cm.$^3$. This suspension is heated in an autoclave at 160° C. for 15 minutes.

After cooling to 90° C. filtration is effected through muslin (filter press or the like). This results in a separation of fraction I. The filtrate, cooled down to 40–50° C. is centrifuged off under the following conditions: period of time in centrifuge 5 min. 2,200 t./min., gravitational field approx. 1,000 g. Fraction II is obtained. After further cooling to 20° C. and raising the salt concentration to approx. 28%, the amylopectin precipitates as fraction III.

Results

Fraction I: 15.3 g., i. e. 22.0% of dry corn
Fraction II: 10.7 g., i. e. 15.4% of dry corn
Fraction III: 34.4 g., i. e. 49.5% of dry corn Composition of the fractions:

Fraction I:
19.8% starch
27.5% protein
Approx. 52.0% cellulose, fat, etc.

Fraction II:
Amylose 80%
Amylopectin 20%

Fraction III:
Amylopectin 97%
Amylose 3%

A quantity of 3.0 g. fat (oil), i. e. approx. 4.3% of the dry corn, can be obtained from the mother liquor e. g. by means of chloroform extraction.

Expressed on whole, dry corn granules:

Total yield of corn: 91.5%

Expressed on the total quantity of starch:
Total yield of starch: 95.0%
Yield of amylose: in all 90% of the theoretical quantity is obtained in fractions II and III
Yield of amylopectin: in all 93.5% of the theoretical quantity is obtained in fractions II and III

EXAMPLE IV

The cell structure of wheat is disturbed by grinding or otherwise. The analytical data of the wheat granules used were as follows:

| | Percent |
|---|---|
| Starch | 64.5 |
| Protein | 9.6 |
| Cellulose | |
| Fat | |
| Ash, etc. | 11.5 |
| Water | |
| | 14.4 |

Amylose content of the wheat starch 20%.

80 g. ground wheat granules are treated in the same way as described in Example III.

Results

Fraction I: 16.9 g., i. e. 24.7% of the dry wheat
Fraction II: 11.0 g., i. e. 16.1% of the dry wheat
Fraction III: 35.8 g., i. e. 52.2% of the dry wheat Composition of the fractions:

Fraction I:
27.9% starch
15.3% protein
Approx. 56.8% cellulose, fat, etc.

Fraction II:
Amylos 80%
Amylopectin 20%

Fraction III:
Amlopectin 98½%
Amylose 1½%

Total yield of wheat 93.0%
Total yield of starch: 91.0%
Total yield of amylose: 94%
Total yield of amylopectin: 94.1%

We claim:

1. Process for fractionating starch into components with branched and linear chains comprising dissolving starch-containing raw materials including natural impurities by heating the material under elevated pressure at a temperature exceeding about 115° C. in an aqueous solvent containing at least one of the compounds of the group consisting of $MgSO_4$, $Na_2SO_4$ and $(NH_4)_2SO_4$, freeing the solution from undissolved material at a temperature above that at which amylose precipitates, cooling the remaining solution to a temperature sufficient to precipitate amylose, separating the precipitated amylose from the solution, precipicating the amylopectin and separating it from the solution, said starch containing raw material being present in the aqueous solvent in an amount sufficient to provide a starch concentration therein of from about 3 to about 20% and said compound being present in the aqueous solvent in from about 5 to about 30% based on the weight of the anhydrous salt.

2. Process according to claim 1 wherein the aqueous solvent contains a reducing substance in a concentration of at least 0.05%.

3. Process for fractionating starch into components with branched and linear chains comprising dissolving starch-containing raw materials including natural impurities by heating the material under elevated pressure at a temperature exceeding about 115° C. in an aqueous solvent containing at least one of the compounds of the group consisting of $MgSO_4$, $NaSO_4$ and $(NH_4)_2SO_4$, freeing the solution from undissolved material at a temperature above that at which amylose precipitates, cooling the remaining solution to between about 40° C. and 50° C. to precipitate amylose, separating the precipitated amylose from the solution, further cooling the solution to precipitate the amylopectin and separating the amylopectin from the solution, said starch containing raw material being present in the aqueous solvent in an amount sufficient to provide a starch concentration therein of from about 3 to about 20% and said compound being present in the aqueous solvent in from about 5 to about 30% based on the weight of the anhydrous salt.

4. Process for fractionating starch into components with branched and linear chains comprising dissolving starch-containing raw materials including natural impurities by heating the material under elevated pressure at a temperature exceeding about 115° C. in an aqueous solvent containing at least one of the compounds of the group consisting of $MgSO_4$, $Na_2SO_4$ and $(NH_4)_2SO_4$, freeing the solution from undissolved material at a temperature between about 100° C. and a lower temperature at which amylose precipitates, cooling the remaining solution to precipitate amylose, separating the precipitated amylose from the solution, increasing the salt concentration of the solution to precipitate the amylopectin and separating the amylopectin from the solution, said starch containing raw material being present in the solution in an amount sufficient to provide a starch concentration therein of from about 3 to about 20%, said salt being present in the solution during the starch dissolving step in from about 18 to about 25%, and said salt concentration being increased to from about 25 to about 30% during the step of precipitating the amylopectin.

5. Process for fractionating starch into components with branched and linear chains comprising dissolving tertiary flour under elevated pressure at a temperature exceeding about 115° C. in an aqueous solvent containing between 5 and about 30% of at least one of the compounds of the group consisting of $MgSO_4$, $Na_2SO_4$ and $(NH_4)_2SO_4$, cooling the solution to a temperature above that at which amylose precipitates and lower than 100° C., freeing the solution from undissolved material at said temperature, cooling the remaining solution to precipitate amylose, separating the precipitated amylose from the solution, precipitating amylopectin and separating the amylopectin from the solution, said tertiary flour being present in the solution in an amount sufficient to provide a starch concentration therein of from about 3 to about 20%.

6. Process for fractionating starch into components with branched and linear chains comprising dissolving potatoes, the cell structure of which has been disrupted, under elevated pressure at a temperature exceeding about 115° C. in an aqueous solvent containing between 5 and about 30% of at least one of the compounds of the group consisting of $MgSO_4$, $Na_2SO_4$ and $(NH_4)_2SO_4$, cooling the solution to a temperature above that at which amylose precipitates and lower than 100° C., freeing the solution from undissolved material at said temperature, cooling the remaining solution to precipitate amylose, separating the precipitated amylose from the solution, precipitating amylopectin and separating the amylopectin from the solution, said potato material being present in the solution in an amount sufficient to provide a starch concentration therein of from about 3 to about 20%.

7. Process for fractionating starch into components with branched and linear chains comprising dissolving ground corn under elevated pressure at a temperature exceeding about 115° C. in an aqueous solvent containing between 5 and about 30% of at least one of the compounds of the group consisting of $MgSO_4$, $Na_2SO_4$ and $(NH_4)_2SO_4$, cooling the solution to a temperature above that at which amylose precipitates and lower than 100° C., freeing the solution from undissolved material, cooling the remaining solution to precipitate amylose, separating the precipitated amylose from the solution, precipitating amylopectin and separating the amylopectin from the solution, said ground corn being present in the solution in an amount sufficient to provide a starch concentration therein of from about 3 to about 20%.

8. Process for fractionating starch into components with branched and linear chains comprising dissolving starch-containing raw materials including natural impurities by heating the material under elevated pressure at a temperature exceeding about 115° C. in an aqueous solvent containing at least one of the compounds of the group consisting of $MgSO_4$, $Na_2SO_4$ and $(NH_4)_2SO_4$, and no more than 5% by volume of an organic compound from the group consisting of amyl alcohol, butyl alcohol, capryl alcohol and di-isopropyl ketone, cooling the solution to a temperature above that at which amylose precipitates and lower than 100° C., freeing the solution from undissolved material, cooling the remaining solution to a temperature sufficient to precipitate amylose, separating the precipitated amylose from the solution, precipitating the amylopectin and separating it from the solution, said starch containing raw material being present in the aqueous solvent in an amount sufficient to provide a starch concentration therein of from about 3 to about 20% and said compound being present in the aqueous solvent in from about 5 to about 30% based on the weight of the anhydrous salt.

9. Process for fractionating starch into components with branched and linear chains comprising dissolving starch-containing raw materials including natural materials under elevated pressure at a temperature exceeding about 115° C., in an aqueous solvent containing between 5 and about 30% of at least one of the compounds of the group consisting of $MgSO_4$, $Na_2SO_4$ and $(NH_4)_2SO_4$, and an organic compound from the group consisting of amyl alcohol, capryl alcohol, butyl alcohol, and di-isopropyl ketone, cooling the solution to a temperature above that at which amylose precipitates and lower than 100° C., freeing the solution from undissolved material at a temperature above about 50° C. and less than about 100° C., cooling the remaining solution to precipitate amylose, separating the precipitated amylose from the solution, precipitating amylopectin and separating the amylopectin from the solution, said starch-containing raw material being present in the solution in an amount sufficient to provide a starch concentration therein of from about 3 to about 15%, and said organic compound, when amyl alcohol, being present in the solution in an amount ranging from about 1.0 to about 3.5 volume percent, when butyl alcohol, being present in about 5 volume percent, when capryl alcohol, being present in from about 0.025 to 0.50 volume percent and when di-isopropyl ketone being present in from about 0.4 to about 0.8 volume percent.

References Cited in the file of this patent

UNITED STATES PATENTS

| | | |
|---|---|---|
| 2,014,799 | Fuller | Sept. 17, 1935 |
| 2,515,095 | Schoch | July 11, 1950 |
| 2,515,096 | Schoch | July 11, 1950 |

FOREIGN PATENTS

| | | |
|---|---|---|
| 5,844 | Great Britain | of 1896 |
| 590,750 | Great Britain | July 28, 1947 |

OTHER REFERENCES

Jour. Textile Institute, January 1948, p. A–60.
Kerr: Chem. and Ind. of Starch (2nd ed.), New York, N. Y., 1950, p. 182.